(12) United States Patent
Pachha et al.

(10) Patent No.: US 11,607,825 B2
(45) Date of Patent: *Mar. 21, 2023

(54) METHOD TO UNIFORMLY DEBUNDLE AND EVENLY DISTRIBUTE HIGH FIBER COUNT CARBON TOW

(71) Applicant: Magna Exteriors Inc., Concord (CA)

(72) Inventors: Ranjit Pachha, Brampton (CA); Jeffrey R. Robbins, Ann Arbor, MI (US); Paul A. Trudeau, Guelph (CA)

(73) Assignee: Magna Exteriors Inc., Concord (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/357,572

(22) Filed: Jun. 24, 2021

(65) Prior Publication Data
US 2021/0316480 A1 Oct. 14, 2021

Related U.S. Application Data

(63) Continuation of application No. 16/306,656, filed as application No. PCT/IB2017/053283 on Jun. 2, 2017, now Pat. No. 11,072,093.

(60) Provisional application No. 62/445,063, filed on Jan. 11, 2017, provisional application No. 62/345,481, filed on Jun. 3, 2016.

(51) Int. Cl.
| | | |
|---|---|---|
| *B29B 11/16* | (2006.01) | |
| *B29B 15/12* | (2006.01) | |
| *C08J 5/18* | (2006.01) | |
| *C08J 5/04* | (2006.01) | |
| *B32B 27/04* | (2006.01) | |
| *C08J 5/24* | (2006.01) | |
| *B29C 70/12* | (2006.01) | |
| *B29K 101/12* | (2006.01) | |
| *B29K 307/04* | (2006.01) | |

(52) U.S. Cl.
CPC ............ *B29B 11/16* (2013.01); *B29B 15/122* (2013.01); *B29C 70/12* (2013.01); *B32B 27/04* (2013.01); *C08J 5/042* (2013.01); *C08J 5/18* (2013.01); *C08J 5/243* (2021.05); *B29K 2101/12* (2013.01); *B29K 2307/04* (2013.01); *C08J 2333/04* (2013.01)

(58) Field of Classification Search
CPC ....... B29B 11/16; B29B 15/122; B29C 70/12; B32B 27/04; C08J 5/042; C08J 5/18; C08J 5/24; C08J 2333/04; B29K 2101/12; B29K 2307/04
See application file for complete search history.

*Primary Examiner* — Cynthia L Schaller
(74) *Attorney, Agent, or Firm* — Warn Partners, P.C.

(57) ABSTRACT

A process for producing a carbon sheet molding compound (SMC). An SMC manufacturing line including at least one conveyor line for laying up SMC resins on a carrier film is provided. A chopped carbon fiber which is evenly distributed using dehumidified supply air and using a pressurized air venturi apparatus which is used to debundle and randomize the carbon fibers, onto the resin on the carrier film as the carrier film moves along the conveyor.

18 Claims, 15 Drawing Sheets

| Specimen Cut out | Right Gm/sq.feet | Center Gm/sq.feet | Left Gm/sq.feet | Wet out |
|---|---|---|---|---|
| Middle of the run | 152.6 | 151.0 | 163.1 | Very good-No dry carbon |
| End of the run | 145.8 | 147.3 | 150.2 | Very good-No dry carbon |

Uniform Distribution - SMC Trial-Batch #002-60

FIG. 12

Tensile Properties before Dehumidified Air(%RH=65)

| Specimen # | Width [mm] | Thickness [mm] | Maximum Load [kN] | % Strain at Max. Load [%] | Stress at Max. Load [MPa] | Modulus (Chord 0.05 % - 0.25 %) [MPa] | Modulus (Young's) [MPa] |
|---|---|---|---|---|---|---|---|
| CH 1 | 12.511 | 2.219 | 5.34 | 0.8 | 192.3 | 24756 | 26067 |
| CH 2 | 12.725 | 2.250 | 5.03 | 0.7 | 175.8 | 22002 | 24380 |
| CH 3 | 12.651 | 2.265 | 5.62 | 1.0 | 195.9 | 20004 | 21094 |
| CH 4 | 12.757 | 2.255 | 4.94 | 0.6 | 171.7 | 28581 | 30596 |
| CH 5 | 12.798 | 2.271 | 5.87 | 0.9 | 201.9 | 23165 | 23991 |
| CH 6 | 12.718 | 2.268 | 6.36 | 0.9 | 220.5 | 27431 | 27521 |
| CH 7 | 12.769 | 2.277 | 5.01 | 0.5 | 172.4 | 30508 | 33386 |
| Mean | 12.704 | 2.258 | 5.45 | 0.8 | 190.1 | 25207 | 26719 |
| Std. Dev. | 0.1 | 0.02 | 1 | 0.2 | 18 | 3789 | 4185 |

| Specimen label | Width [mm] | Thickness [mm] | Maximum Load [kN] | % Strain at Max. Load [%] | Stress at Max. Load [MPa] | Modulus (Chord 0.05 % - 0.25 %) [MPa] | Modulus (Young's) [MPa] |
|---|---|---|---|---|---|---|---|
| CH 0-1 | 13.073 | 2.145 | 2.82 | 0.4 | 100.4 | 26765 | 33927 |
| CH 0-2 | 12.947 | 2.163 | 3.38 | 0.5 | 120.6 | 22247 | 23251 |
| CH 0-3 | 12.808 | 2.162 | 3.16 | 0.3 | 114.0 | 30463 | 34380 |
| CH 0-4 | 12.921 | 2.181 | 3.45 | 0.5 | 122.3 | 23319 | 23392 |
| CH 0-5 | 13.012 | 2.198 | 1.59 | 0.2 | 55.6* | 17001* | 21043* |
| CH 0-6 | 12.888 | 2.215 | 2.07 | 0.2 | 72.7* | 15286* | 16267* |
| CH 0-7 | 12.897 | 2.196 | 3.19 | 0.3 | 112.8* | 40020* | 77312* |
| Mean | 12.935 | 2.180 | 2.81 | 0.4 | 114.3 | 25699 | 28738 |
| Std. Dev. | 0.1 | 0.02 | 1 | 0.1 | 10 | 3715 | 6257 |

FIG. 13

Tensile Properties using Dehumidified Air (%RH=15)

| Specimen # | Width mm | Thickness mm | Tensile Strength MPa | Elongation at Break % | Modulus MPa |
|---|---|---|---|---|---|
| E 1 | 25.581 | 2.541 | 223.2 | 0.8 | 31588 |
| E 2 | 25.564 | 2.601 | 261.5 | 0.8 | 37379 |
| E 3 | 25.486 | 2.611 | 230.7 | 0.7 | 34083 |
| E 4 | 25.537 | 2.628 | 250.2 | 1.2 | 25918 |
| E 5 | 25.583 | 2.528 | 260.1 | 0.9 | 32428 |
| Mean | 25.558 | 2.574 | 245.14 | 0.86 | 32279 |
| Std. Dev. | | | 17.3 | 0.2 | 4190 |

Plaque 3-74-14-9

| Specimen # | Width mm | Thickness mm | Tensile Strength MPa | Elongation at Break % | Modulus MPa |
|---|---|---|---|---|---|
| E 1 | 25.485 | 2.558 | 234.7 | 0.7 | 34934 |
| E 2 | 25.523 | 2.571 | 214.9 | 0.7 | 33609 |
| E 3 | 25.611 | 2.565 | 208.4 | 0.7 | 42057 |
| E 4 | 25.589 | 2.585 | 197.8 | 0.7 | 29172 |
| E 5 | 25.619 | 2.59 | 207.7 | 0.6 | 35761 |
| Mean | 25.559 | 2.57 | 212.7 | 0.70 | 35106.6 |
| Std. Dev. | | | 13.7 | 0.05 | 4642 |

FIG. 14

METHOD TO UNIFORMLY DEBUNDLE AND EVENLY DISTRIBUTE HIGH FIBER COUNT CARBON TOW

CROSS-REFERENCE TO RELATED APPLICATIONS

This application is a continuation of U.S. patent application Ser. No. 16/306,656, filed Dec. 3, 2018, which is a National Stage of PCT International Application No. PCT/IB2017/053283, filed Jun. 2, 2017, which claims the benefit of U.S. Provisional Patent Application No. 62/345,481, filed Jun. 3, 2016 and U.S. Provisional Patent Application No. 62/445,063, filed Jan. 11, 2017. The disclosures of the above applications are incorporated herein by reference.

FIELD OF THE INVENTION

The present invention relates to a process for producing a carbon sheet molding composition.

BACKGROUND OF THE INVENTION

The uniform debundling of Carbon Tow in SMC manufacturing is critical to achieve consistent and high mechanical properties required in structural applications. Individual air-venturi's are used to amplify and accelerate the air which is used to debundle and transport the carbon fibers. Variation in the velocity of air from individual air-venturi's, result in non-uniform opening of the chopped carbon. Non-uniform opening of carbon tows result in uneven wetting of carbon fibers with the matrix resin. If the carbon fiber bundles are not opened up well, the resin will be restricted in reaching the individual carbon fibers and will not impregnate them fully, and this results in dry carbon fibers in the manufactured SMC. Also if there is a variation in the debundling of the carbon bundles across the film, the mechanical properties will be negatively impacted. Variations in the air velocity used for debundling the carbon also leads to a non-uniform distribution of carbon across the carrier film. Carbon tows which are partially debundled tend to be heavy and drop directly under the cutter resulting in a higher carbon density at that location. The over debundling of carbon results in lighter carbon which tends to float from chamber to chamber and settle down at random locations resulting in highly variable carbon density at the intended location under the cutter. These conditions often result in undesirable high/low carbon concentrations. In these cases the high carbon locations become resin starved and low carbon locations become resin rich. The high velocity air coming out of the transvector needs to be balanced and excess air needs to be exhausted out of the chamber in order to prevent the carbon fiber from crossing from cutter to cutter. To do this two exhausts were set up, one before the chopper and one after the chopper. The exhaust openings were adjusted to neutralize the air pressure from the transvector and prevent the chopped fiber from being pulled in one particular direction or side.

Additionally, the humidity in the ambient air can vary depending on the time of the day, year and season. The sizing on the carbon tends to absorb moisture under high humidity conditions and this interferes with the reaction of the isocyanate and the resin and results in reducing the adhesion of the resin to the carbon, which is also undesirable.

Also problematic is the formation of wrinkles in the carrier film as the plastic is pulled around pulleys and over the line under tension. Wrinkles in the carrier film prevent uniform spreading of the resin across the film. These areas do not become saturated in resin and create resin starved areas in the SMC.

In order to solve these problems it is the objective in the present invention to: 1) provide uniform opening of high yield chopped carbon yarns with as small as 12,000 filaments per yarn to greater than 50,000 filaments; 2) provide uniform and consistent distribution of the carbon across carrier film; 3) provide a reduced level of humidity in the air used to debundle the carbon; and, 4) to provide uniform spreading of resin on the carrier film.

SUMMARY OF THE INVENTION

A process for producing a carbon sheet molding composition comprising the steps of:

Providing an SMC manufacturing line including at least one conveyor line for laying up SMC resins on a carrier film;

Providing a chopped carbon fiber which is evenly distributed using dehumidified air in conjunction with and air amplified venturi system used to transport the fiber tows into the cutting chambers; as well as, introduce energy needed to open the carbon bundles, onto a uniform resin film transported on a carrier film that moves along the SMC lines conveyor.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 10 through 14 are graphs and test results supporting the examples and comparative examples set forth herein;

DETAILED DESCRIPTION OF THE PREFERRED EMBODIMENTS

Figure 1:
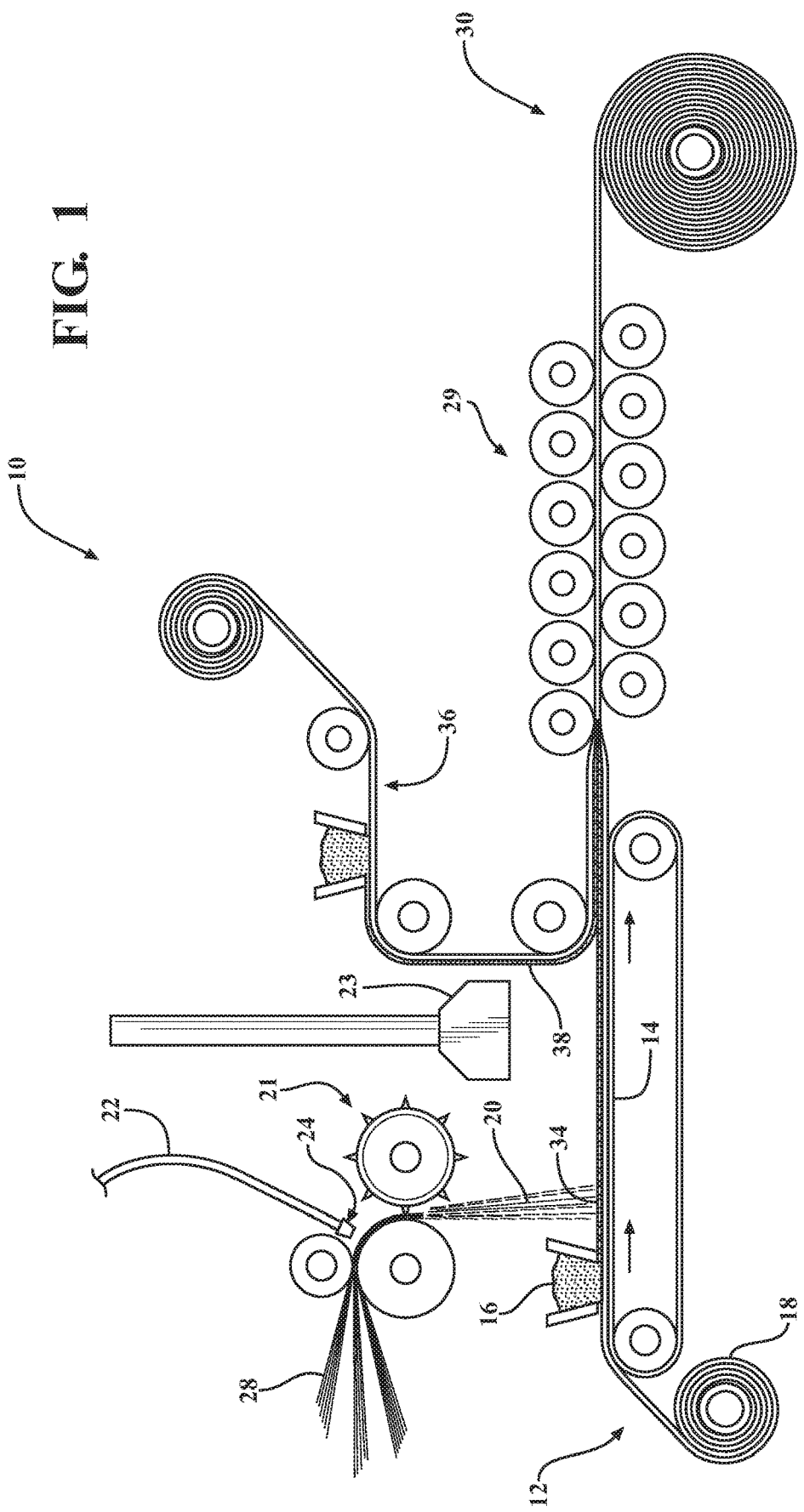
FIG. 1 is a schematic view of the process in accordance with the present invention.

The following description of the preferred embodiment(s) is merely exemplary in nature and is in no way intended to limit the invention, its application, or uses.

Referring to the figures generally, a process for producing a carbon sheet molding compound (SMC) is generally shown at 10. The process comprises the steps of first providing an SMC manufacturing line 12 including at least one conveyor line 14 for laying up SMC resins 16 on a carrier film 18. A chopped carbon fiber 20 from a chopper system indicated generally at 21 is provided which is evenly distributed using dehumidified air 22 by a transvector apparatus or air-amplifier indicated generally at 24 onto the resin on the carrier film 18 as the carrier film 18 moves along the conveyor 14. An exhaust system 23 is also provided for balancing air pressures.

A cutter 26 is provided for chopping raw continuous carbon fiber strands 28 into predetermined sizes suitable for adding to the SMC composition 30. The cutter 26 has dividers 32 extending down to the exit side of the chopper for assistance with distribution of the chopped carbon fibers 20 as best illustrated in FIGS. 2-4.

Figure 2:
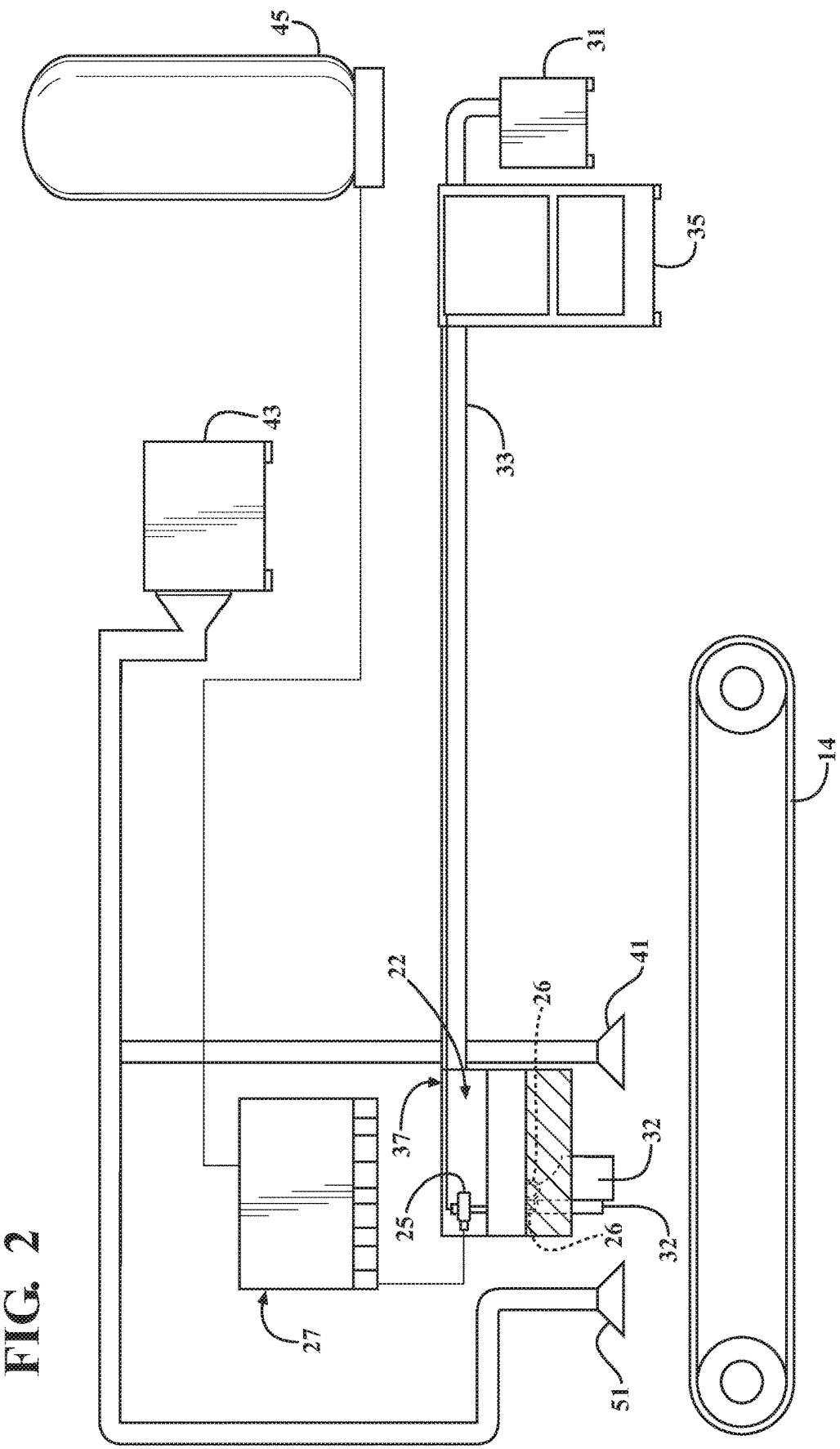
FIG. 2 is a schematic illustration of the air flow used in accordance with the present invention.
Figure 3:
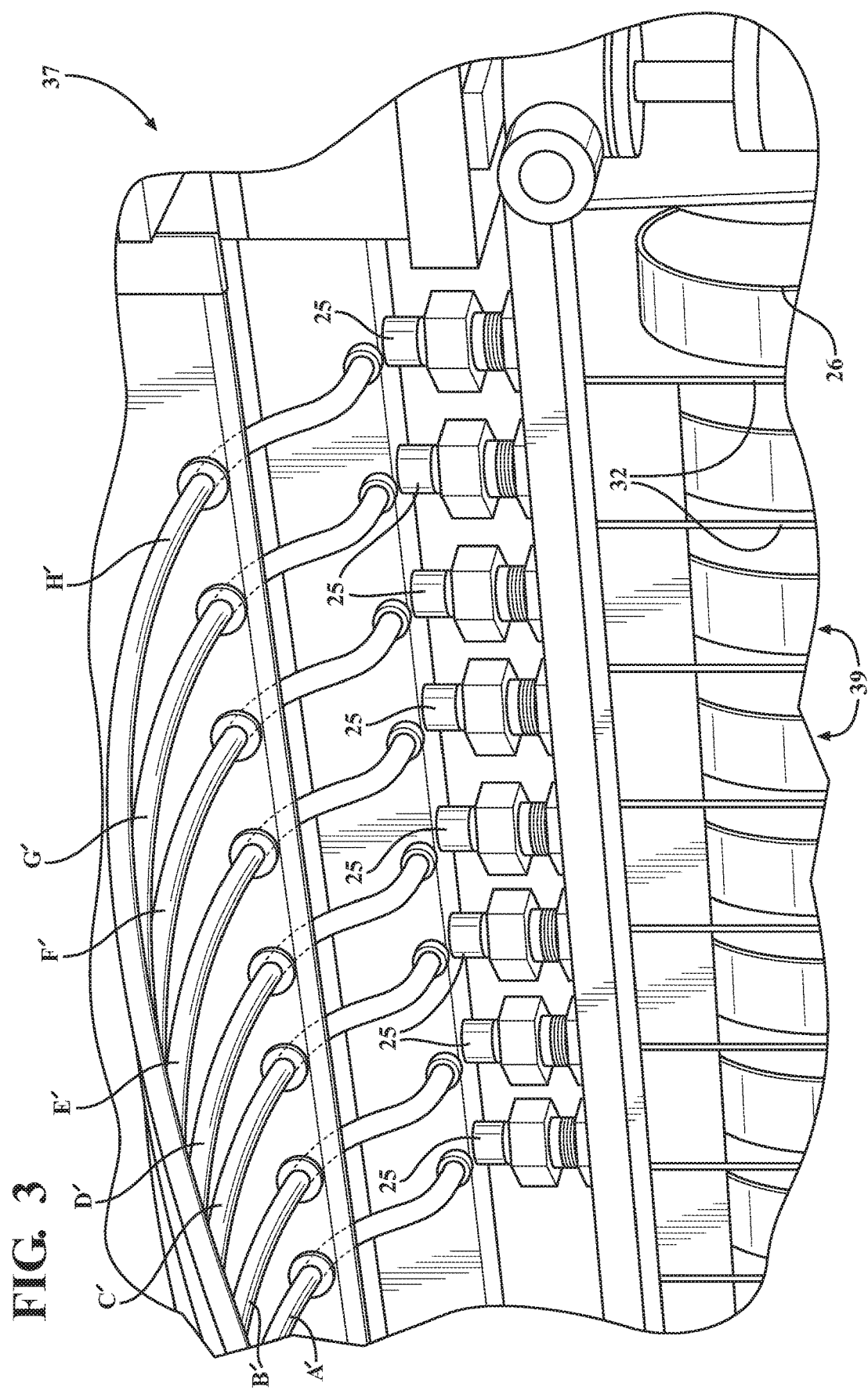
FIG. 3 is a plan view of the air-amplifiers, chopper and divider apparatus used in the process of the present invention.
Figure 4:
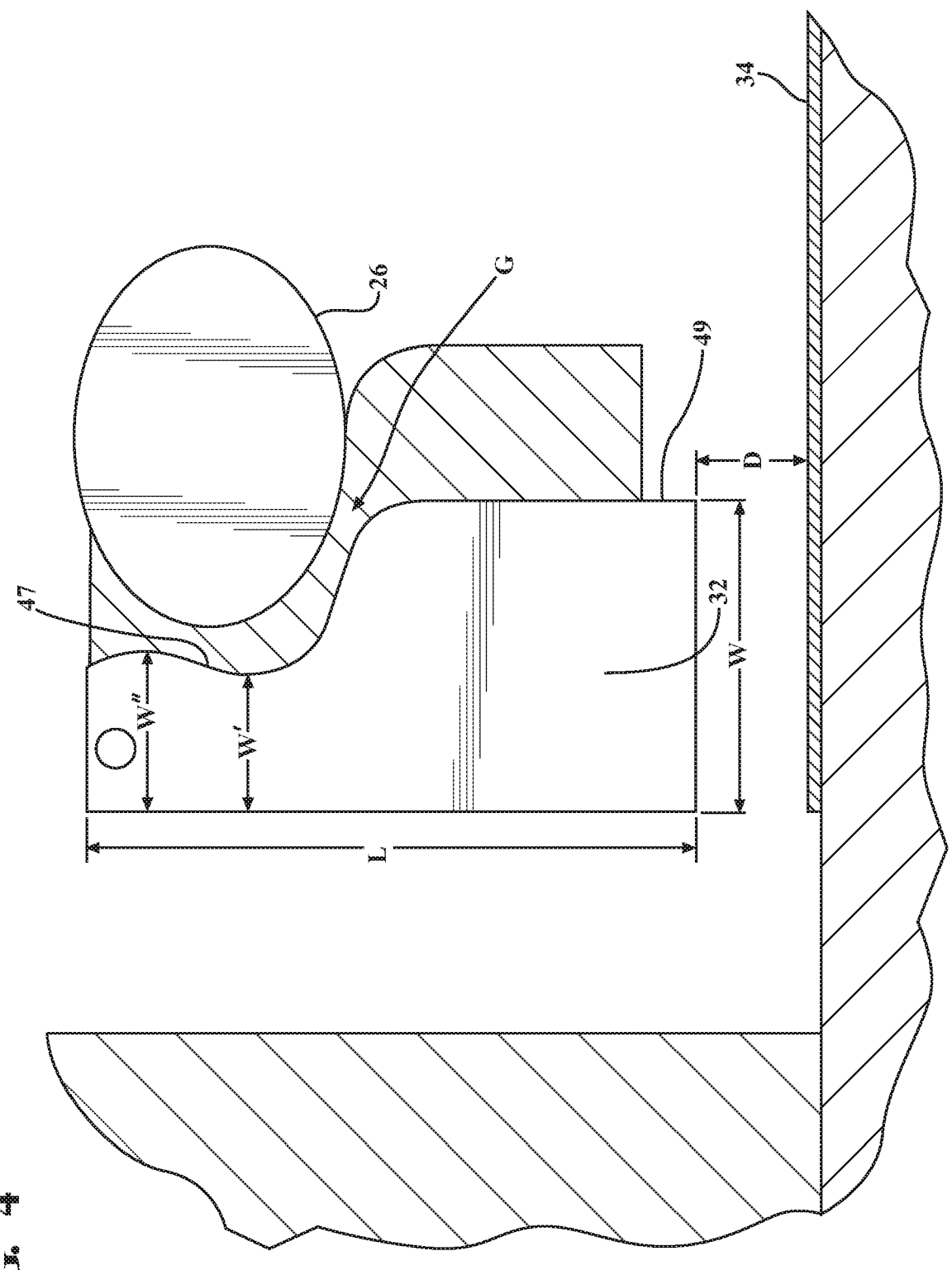
FIG. 4 is a illustrative view of the divider system used in the process of the present invention.
Figure 6:
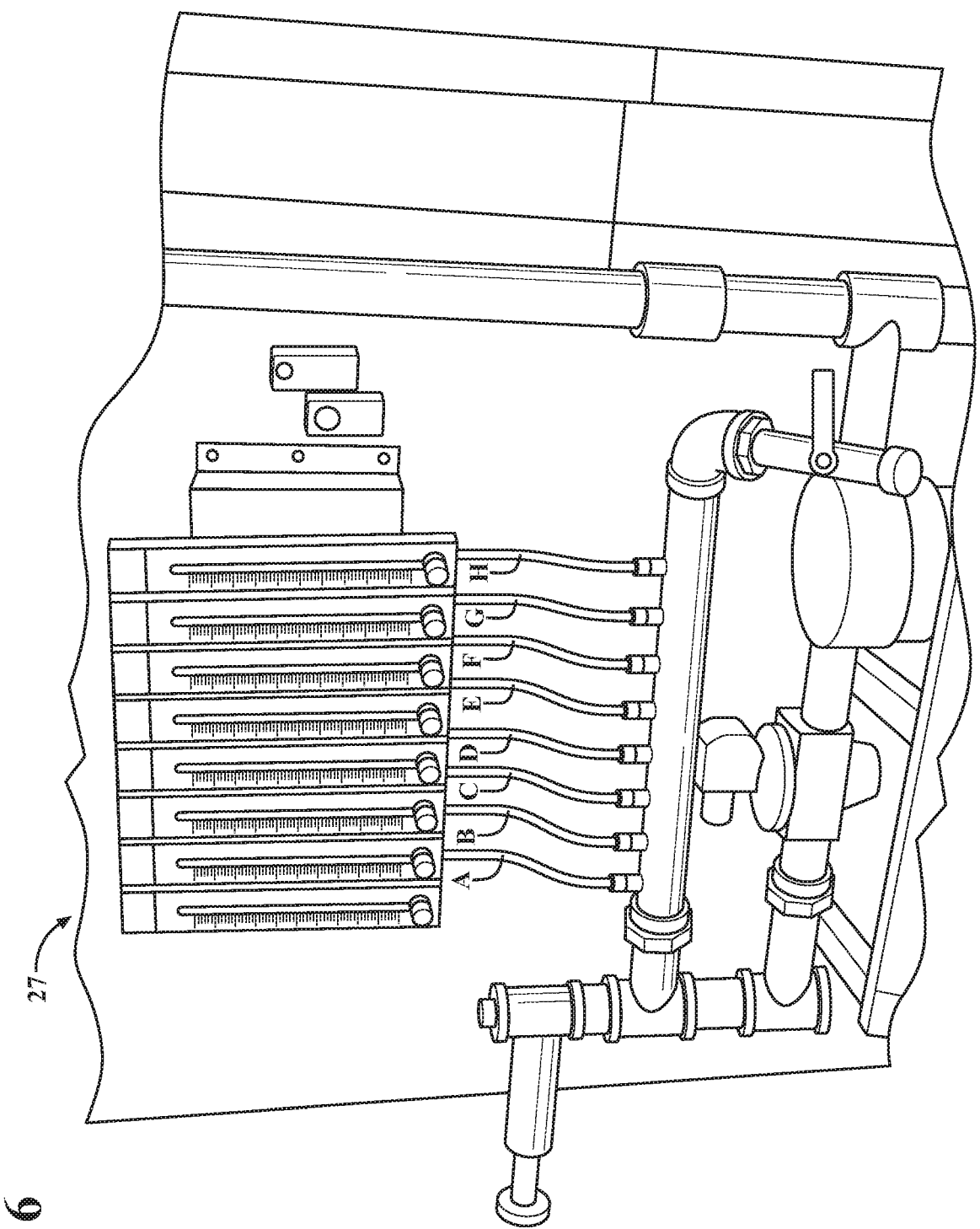
FIG. 6 is a perspective view of the flow meter air control apparatus for controlling air flow to the air amplifiers in the present invention.

As best shown in FIGS. 2-3 and 6, the air-amplifier apparatus has an air flow control system 27 with a series (A-H) of controllable air outlets for adjusting the flow of chopped carbon fiber evenly through the dividers 32 and onto the resin containing carrier film 34 moving along the conveyor 14. FIG. 3 depicts airlines (A'-H') to respective transvectors 25. More or less than eight transvectors depending on the application are contemplated without departure from the scope of the present invention. The air flow control 27 controls compressed air to individual transvectors 25. Preferably, there are a plurality of compressed air channels to the transvectors, e.g., 8; one for each transvector 25. Preferably, the air flow control 27 receives compressed air from a compressed air storage 45. The transvectors 25 receive compressed air from the airlines (A'-H') and also carbon and dry air 22 provided from a dehumidifier 31 passed through a creel box 35.

As best shown in FIG. 2, a duct 33 if provided from the creel box 35 to the inlet of the chopper box 37. This duct 33 makes it possible to locally control the environment. A dehumidifier 31 was integrated at the entry side of the creel box 35. The dry air from the dehumidifier 31 was continuously passed through the creel box 35 and through a plenum to the chopper system 21 and leading to the transvectors 25. Trials conducted with higher humidity ambient air and dehumidified air showed that the mechanical properties increased with introducing dehumidified air (see FIGS. 13-14).

The process 10 also includes a mechanism 36 for depositing a second resin coated carrier film 38 after the chopped carbon fiber is deposited on to the resin coated carrier 34 moving along the conveyor 14. The carrier films can pass between compaction rolls indicated generally at 29, such as parallel or offset series of upper/lower rolls with the carrier films operably therebetween, and the SMC composition 30 wound by a winder apparatus.

Figure 7:
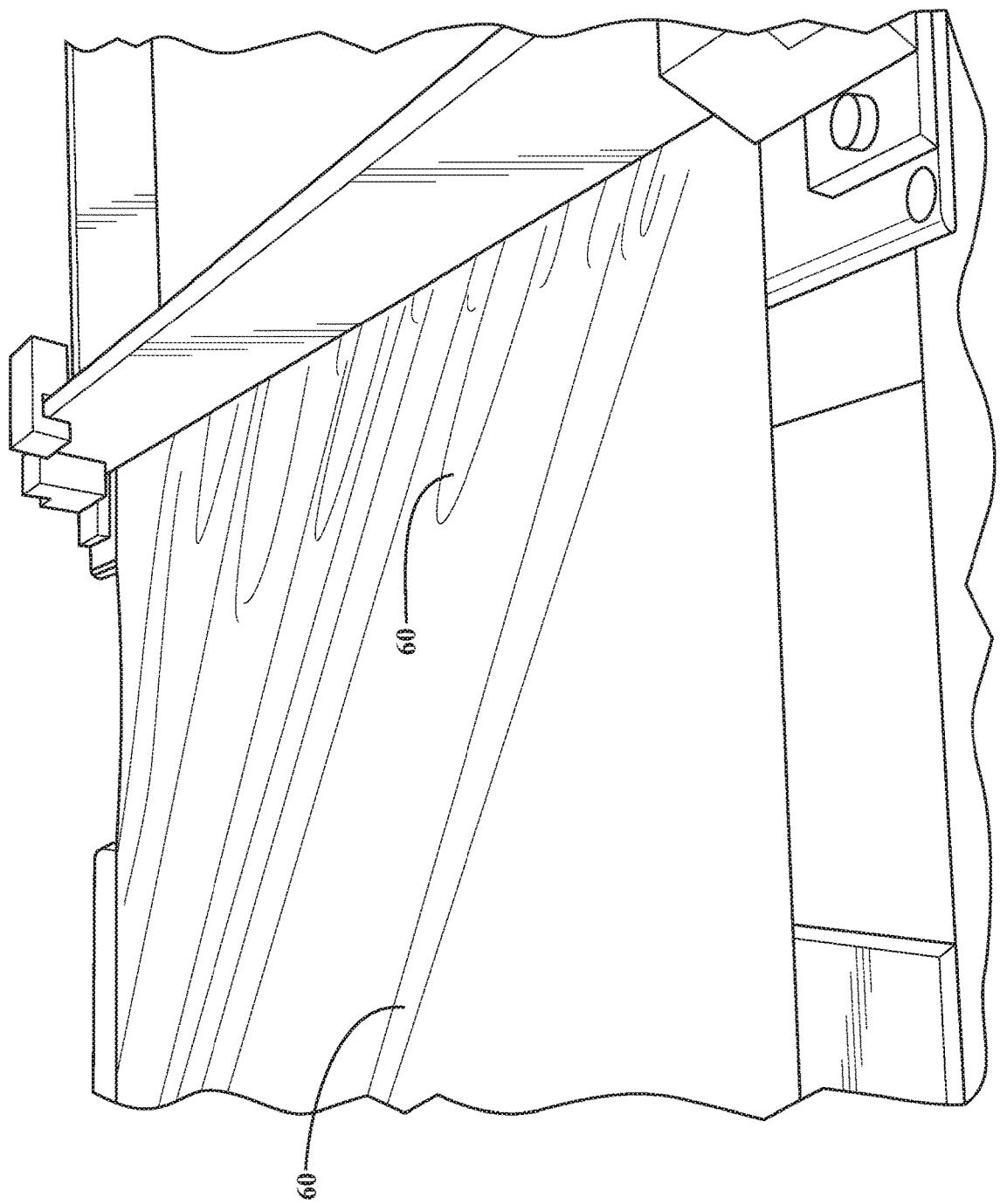
FIGS. 7-9 are views illustrating the process of controlling or minimizing the formation of wrinkles on the carrier film.

As illustrated in FIG. 7, wrinkles 60 can form on the carrier film as the carrier film unwinds from the roll. This can create resin-lacking streaks on the carrier film. Low resin areas cause blisters and weak structural properties.

Figure 8A:
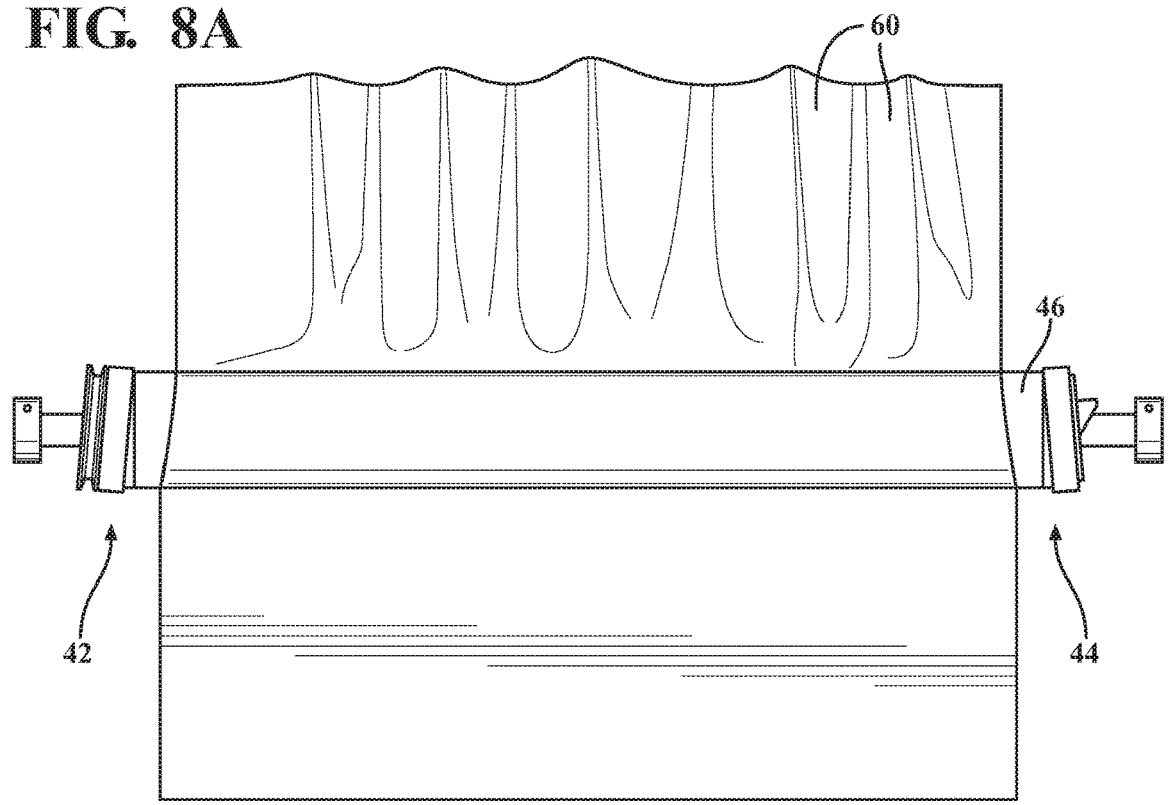
Figure 8B:
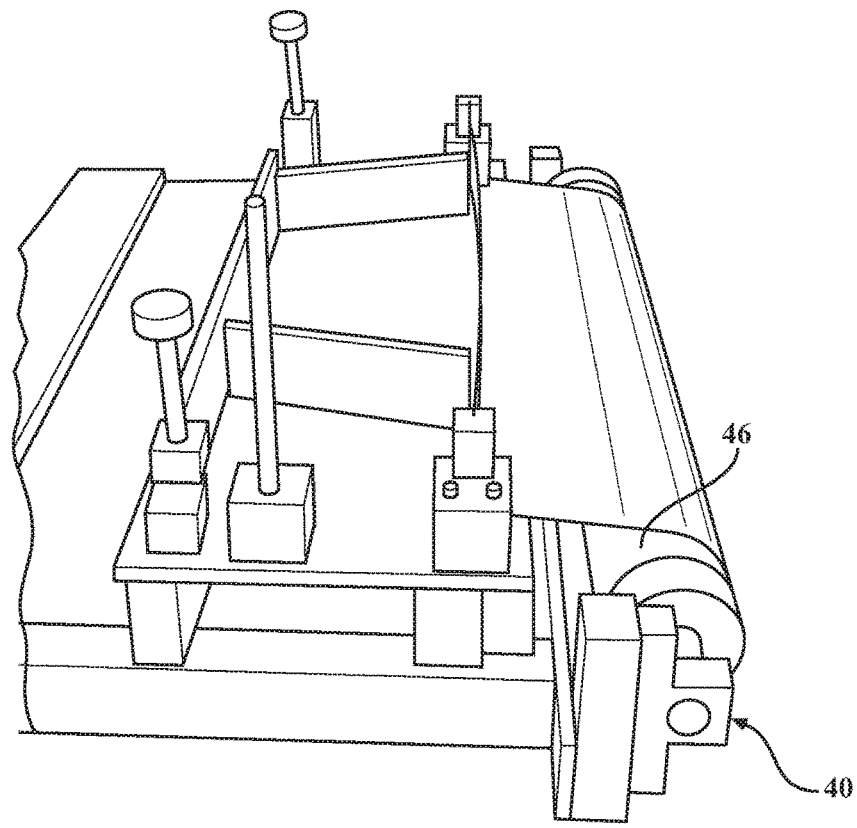
Figure 9:
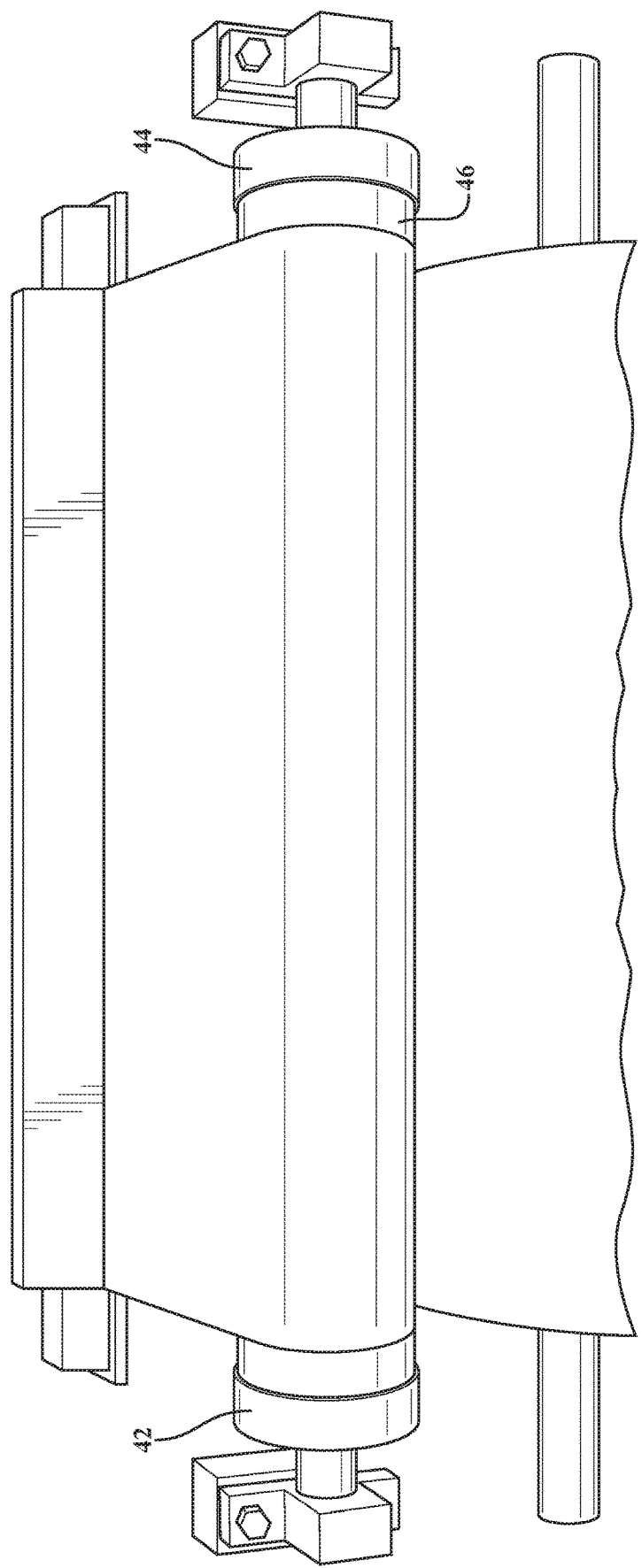

As shown in FIGS. 8A-9, according to an embodiment of the present invention, an anti-wrinkle apparatus shown generally at 40 is provided for removing wrinkles 60 in the SMC product by providing at least one spreader roll 46 with angularly displaced ends 42 and 44. As the spreading roll 46 rotates with the film, the film enters one side of a particular length and leaves the other side of another particular length to remove the wrinkles. Alternatively, the ends are not angled.

Figure 15:
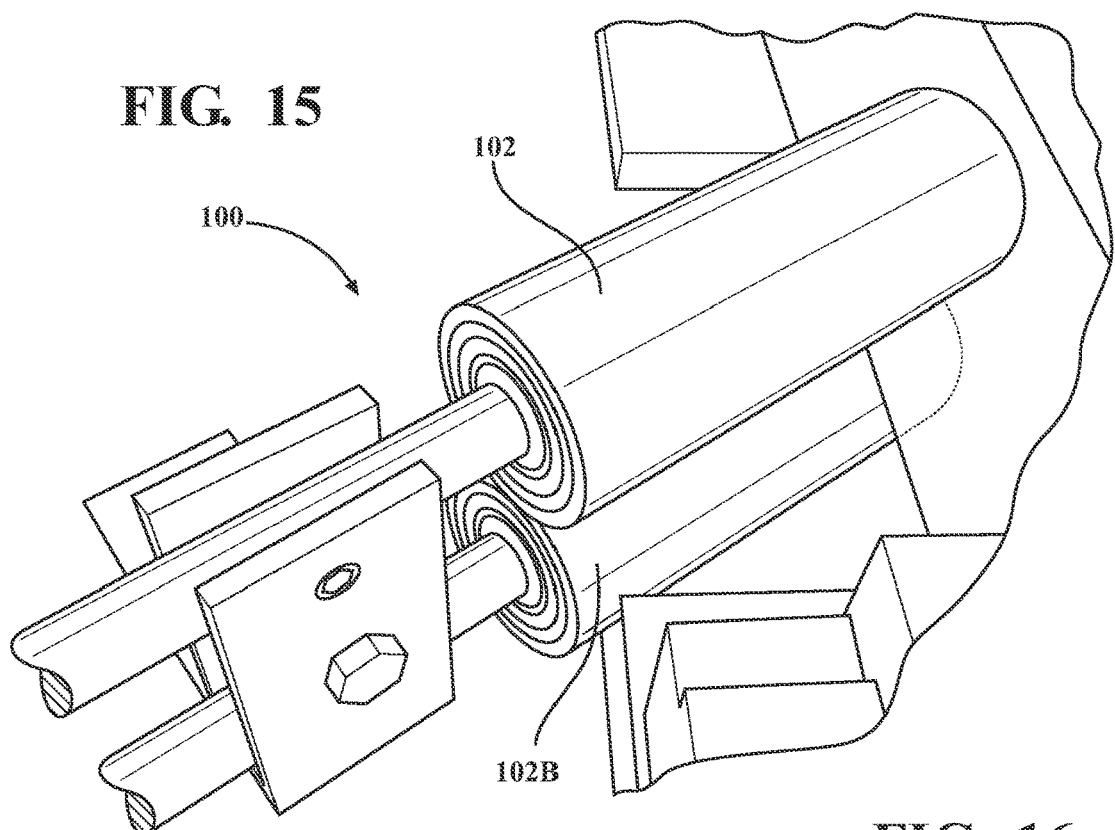
FIG. 15 is a perspective view of a nip roller, in accordance with an embodiment of the present invention; and, FIG. 16 is a perspective view of the nip rollers used after the doctor boxes, adjacent to the film edges, in accordance with the present invention.
Figure 16:
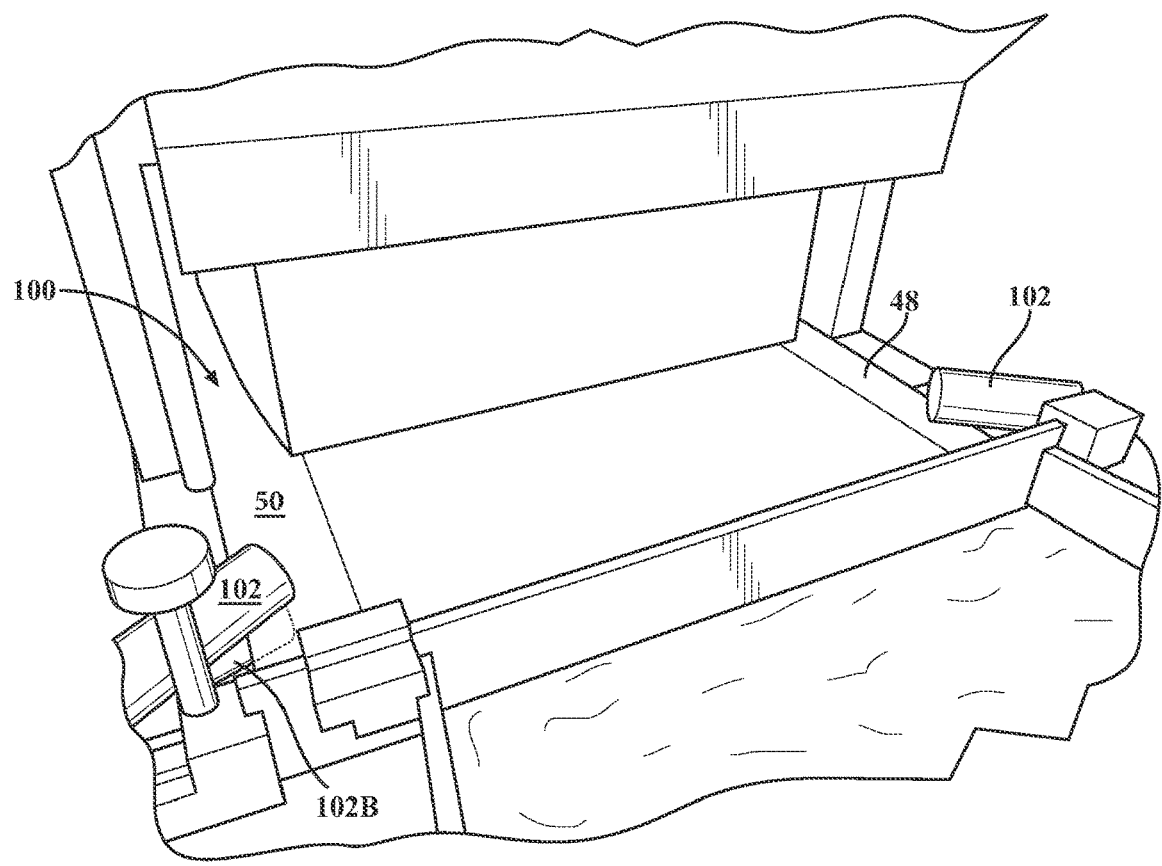

Referring to FIGS. 15-16, according to a preferred embodiment of the present invention, an anti-wrinkle apparatus shown generally at 100 is provided for removing the wrinkles in the carrier film by providing at least one set of first and second nip rollers 102,1026 on the two edges of the film 48 and 50. These nip rollers help remove wrinkles caused by the tensioning of the film being pulled by the compactor. The film travels between the first and second nip rollers 102 and 1026.

The nip rollers 102,102B are tensioning rollers placed at a predetermined angle to each side of the film 48,50. The angled nip rollers tend to pull the film outwards thereby limiting or eliminating the wrinkles caused by the pulling of the film by the compactor.

A particularly preferred nip roller is Adjusta-Pull® Anti-Wrinkle system manufactured by Converter Accessory Corporation of Wind Gap, Pa.

According to a most preferred embodiment of the present invention, the combination of at least one film spreader roll 40 and at least one pair of nip rolls 102,1028 on each side of the film is provided to eliminate film wrinkles.

The film spreading roll 46 functions using a membrane that articulates mechanically as the film is wound around the roll. This tensions the film radially and was positioned before at least one of the doctor boxes, e.g., box of resin 16 and upper resin box. As well the angled nip-rolls 102,1028 create radial tension by spreading the film between an elastomeric and metallic roll. These were positioned after at least one of the doctor boxes. Trials were conducted with the film spreading roll and nip rollers resulting in a smooth flat film which improved the uniform distribution of resin.

The film spreading roll 46 is an elastomeric covered spread roll.

A particularly preferred film spread roll is Wrinkle-Stop® manufactured by Converter Accessory Corporation (CAC) of Wind Gap, Pa.

In accordance with the present invention the process of the present invention provides improved manufacturing and carbon SMC materials including: Quasi isotropic properties, being the ability to use single layer and achieve quasi isotropic properties; it provides a uniform carbon distribution; films produced include a lower coefficient of standard deviation in the properties; a consistent quality of Carbon SMC is produced with substantially no dry fibers or resin rich areas; and, the final SMC has superior mechanical properties.

Examples

Traditional cot roll cutters do not use air to open fibers. Chopped carbon without the aid of air debundling tend to have directional properties unlike debundled carbon which have quasi isotropic properties. Also large bundles of carbon are difficult to wet out, so lower yield carbon tows from 3-12K can be chopped with this style of cutter. However the cost of the carbon fiber product goes up.

The other cutters commercially available do not use air and they do not debundle the carbon. Those choppers just chop the carbon and hence the properties of SMC made from these choppers are directional. Initial trails were conducted with ambient air.

Ambient air can have a high level of humidity. The sizing on the chopped carbon absorbs the humidity and causes variations in the mechanical properties due to a reduction in the interface properties which affected the adhesion of the fibers to the resin. Commonly Magnesium Oxide is used in SMC with vinyl ester (VE) resin to thicken the resin, this chemistry does not bond well with carbon resulting in lower properties. The thickener employed in this innovative system uses an isocyanate which bonds with the fibers resulting in higher properties at similar fiber concentrations. This isocyanate thickener reacts negatively with the moisture absorbed by the sizing on the carbon, resulting in poor bonding between the resin and the carbon.

The film conveyor employed flat idler rolls and a banana type roll to attempt to minimize film wrinkles. These devices were ineffective in eliminating the creation of small wrinkles in the film. To resolve the issue a combination of side mounted nip-rollers 102,102B after the doctor box, positioned at approximately 45° to the line direction of the film, and the addition of a full width film spreading roll 46 before the doctor box, eliminates the problematic film wrinkles. It is understood that alternative positions in the system are contemplated depending on the application without departure from the scope of the present invention.

The carbon fibers have a predetermined length dependent upon the particular application. Generally, the fiber length is 13 to 75 millimeters, typically, 25-75 mm, preferably about 25 mm. However, shorter or longer fiber lengths are contemplated depending on the application without departure from the scope of the present invention.

The chopper 37 is an air assisted carbon chopper. A preferred manufacturer of the carbon chopping system is Brenner International having a place of business in Newark, Ohio. The fiber chopping system uses high velocity air from transvectors 25 and individual cutting chambers 39 to debundle the carbon tows. One of the advantages of debundling individual carbon fiber from the carbon tow is that the resin distribution between individual fibers are fairly uniform. The non debundled carbon tow tend to have resin starved area within individual fiber in a tow and resin rich area between two non debundled tow. This creates a non uniform resin distribution which results in lower mechanical properties. The advantage of using air to debundle the carbon is that it helps to create a highly turbulent air stream that contributes to randomizing the carbon after chopping and this randomization reduces variation in the quasi-isotropic properties as compared to directional properties achieved using other fiber cutters. As a result the layers of SMC do not need to be stacked randomly to achieve quasi-isotropic properties. The challenge with using air to debundle the carbon is that the air currents can contribute to erratic flow and introduce other sources of variation. The cutter in this invention consists of eight chambers 39 and each chamber has eight individual chopping blades 62, a transvector 25 or air-amplifier assists the transportation of the carbon tow in to the cutter, and a bushing through which the carbon tow and air flows. The transvector amplifies the air flow and speed (1-4×) which helps in debundling the carbon as it goes through the chopper. Individual chopper chambers consist of eight blades which continuously chop each of the carbon tows, which are fed through the air-amplifiers 25. The amplification of each transvector 25 is created using a venturi effect. A controlled flow rate of air is supplied to the side mounted inlet, an internal orifice gap creates a drop in pressure which draws additional air into the axial chamber of the transvector. Adjusting the venturi gap with calibrated shims, e.g., 0.002" and 0.003" thick, makes it possible to tune the amplification of each transvector 25 and corresponding exit velocity. It was found that the amplification of individual transvectors 25 were slightly different. The transvector 25 used for amplifying the air requires adjustment and calibration to achieve a uniform amplification on all transvectors 25. This was done by setting the input velocity and measuring the output velocity of the eight transvectors 25. In order to achieve the same output velocity, the venturi gap was calibrated using shims (3-10 thou.). Further adjustment of the output velocity of each transvector 25 was done by adjusting the air flow meter 27 which controls the inlet air flow to the transvector 25. By controlling the airflow and velocity it was possible to uniformly debundle each chopped carbon tow individually, and get a more uniform distribution of the carbon from zone to zone.

Acrylic dividers 32 extending below the chopper, were installed to further separate the eight cutting zones. This separation and confinement above the carrier film 14 helped to straighten the falling of the random carbon fibers 20, minimizing the carbon fibers 20 from floating from one zone 39 to another zone 39 (e.g., see FIGS. 3-4). Any other suitable material for dividers are contemplated depending on the application without departure from the scope of the present invention. The geometry of the dividers 32 were optimized to minimize carbon fibers 20 from getting caught and sticking to the edges of the dividers as well as the length to provide straightening as the fibers fall but an ability to overlap the adjacent cutters. If the dividers were too close to the surface film, they created individual rows of chopped carbon which resembled corn rows. This typically created resin channels. To prevent this, the length of the dividers need to be optimized to promote straightening with some overlapping of the falling carbon. Also the contours on the dividers had to be shaped in such a way that the carbon did not get trapped between the dividers and the chopper. The air velocity in the chamber was measured; as well as, the exhaust systems flow rate and the inlet air due to the transvectors. The objective was to balance the airflow to minimize turbulence in the chamber. The air velocity of the exhaust was adjusted using dam gate styled dampers. The air velocity in the exhaust was maintained at such a level so that there was no significant air drafts in the cutter box and only the excess air and carbon dust were exhausted.

Figure 5:
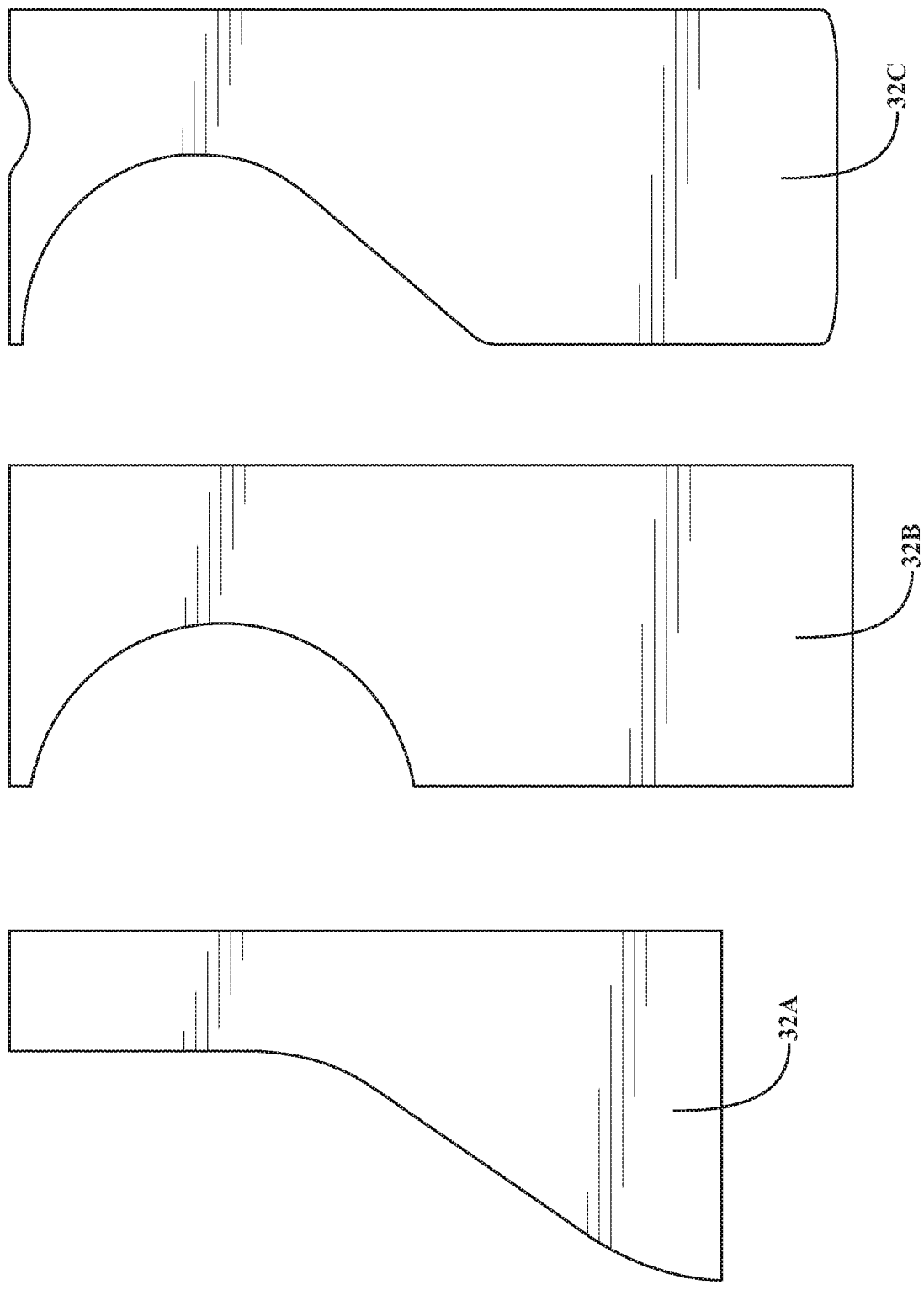
FIG. 5 is a sketch of divider designs useful in the present invention.

Trials were conducted by varying the air velocity on the individual carbon chopper zones (zones indicated generally at 39 in FIG. 3). It was observed that air flow between 4.5 to 6.2 cubic feet per minute (cfm) was required for optimal opening (e.g., FIGS. 2-3 and 6). Again air flow to the individual chopper had to be calibrated between these two ranges to find the optimum air flow for the particular chopper zone 39. The distribution of the carbon was also controlled by installing dividers 32 between each individual chopper zone 39 (e.g., FIG. 4). The initial set of dividers 32A-32C (e.g, length 11-13 inches and narrowest width between 5.4-6.3 inches) were designed in such a way that there was a very small lower gap between the base of the chopper and the divider (e.g., FIG. 5). This resulted in carbon getting trapped between the divider and the chopper. The trapped carbon continued to accumulate and prevented the free falling of chopped carbon. The accumulated carbon then either falls as a bunch or becomes so large that it eventually chokes up the cutter. The gap between the chopper base and the divider was gradually increased until the carbon did not get trapped. Also the length of the divider had to be adjusted. If the length of the divider was too long, it result in creating visible compartments of fibers resembling corn rows of carbon between the dividers. These corn rows were then visible in the compounded sheet and resulted in variations of fiber content. If the length of the divider was too short the carbon would cross from one zone 39 to the next in an uncontrolled fashion. The air movement inside the chopper box was controlled by adjusting the air flow in the transvector 25 and controlling the two exhausts 41 and 51 (see FIG. 2) to balance the air pressure and minimize either over exhausting the carbon or forcing the carbon out of the line. The exhausts 41,51 are coupled to an air vacuum system 43.

Figure 10:
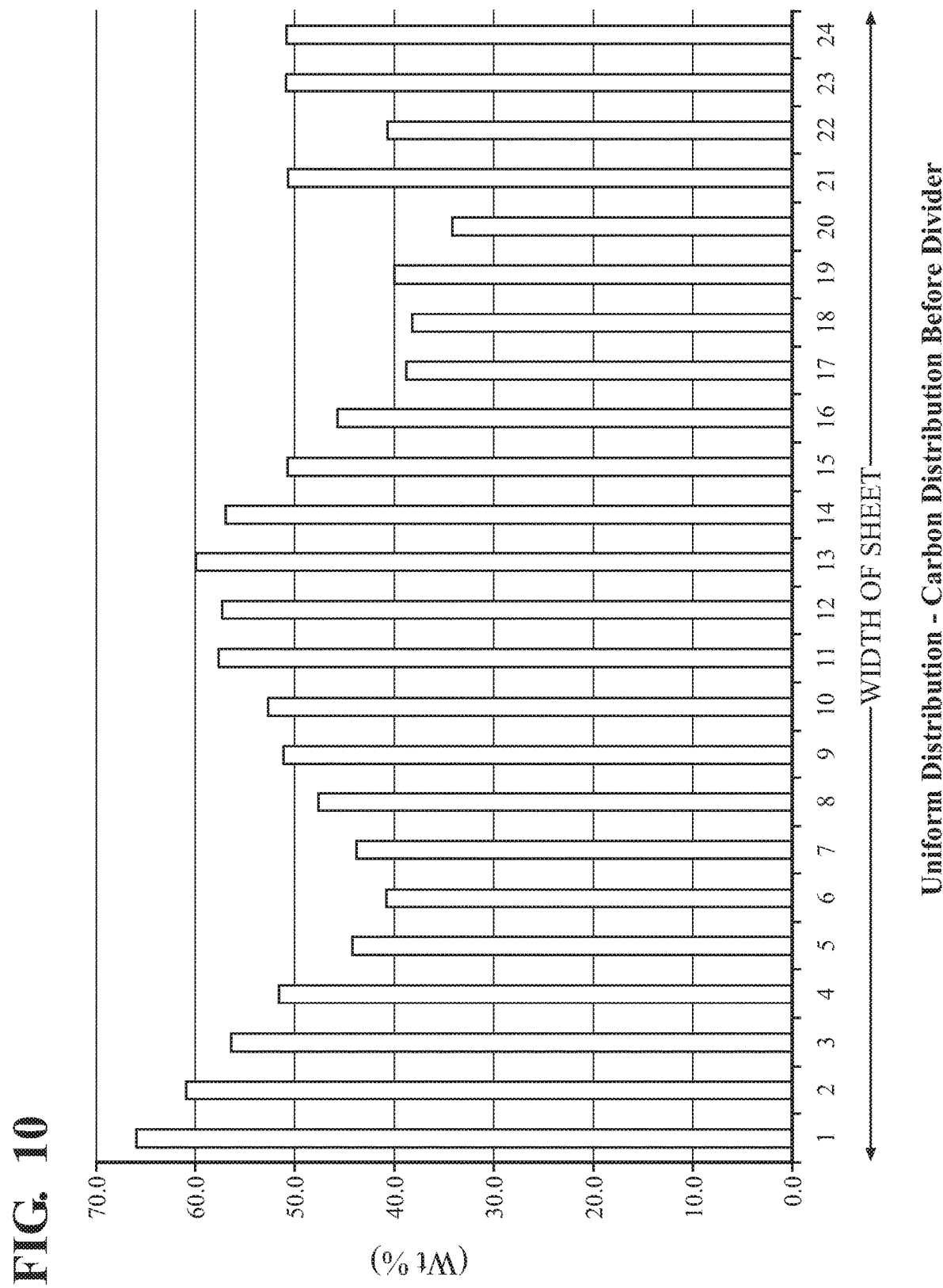
Figure 11:
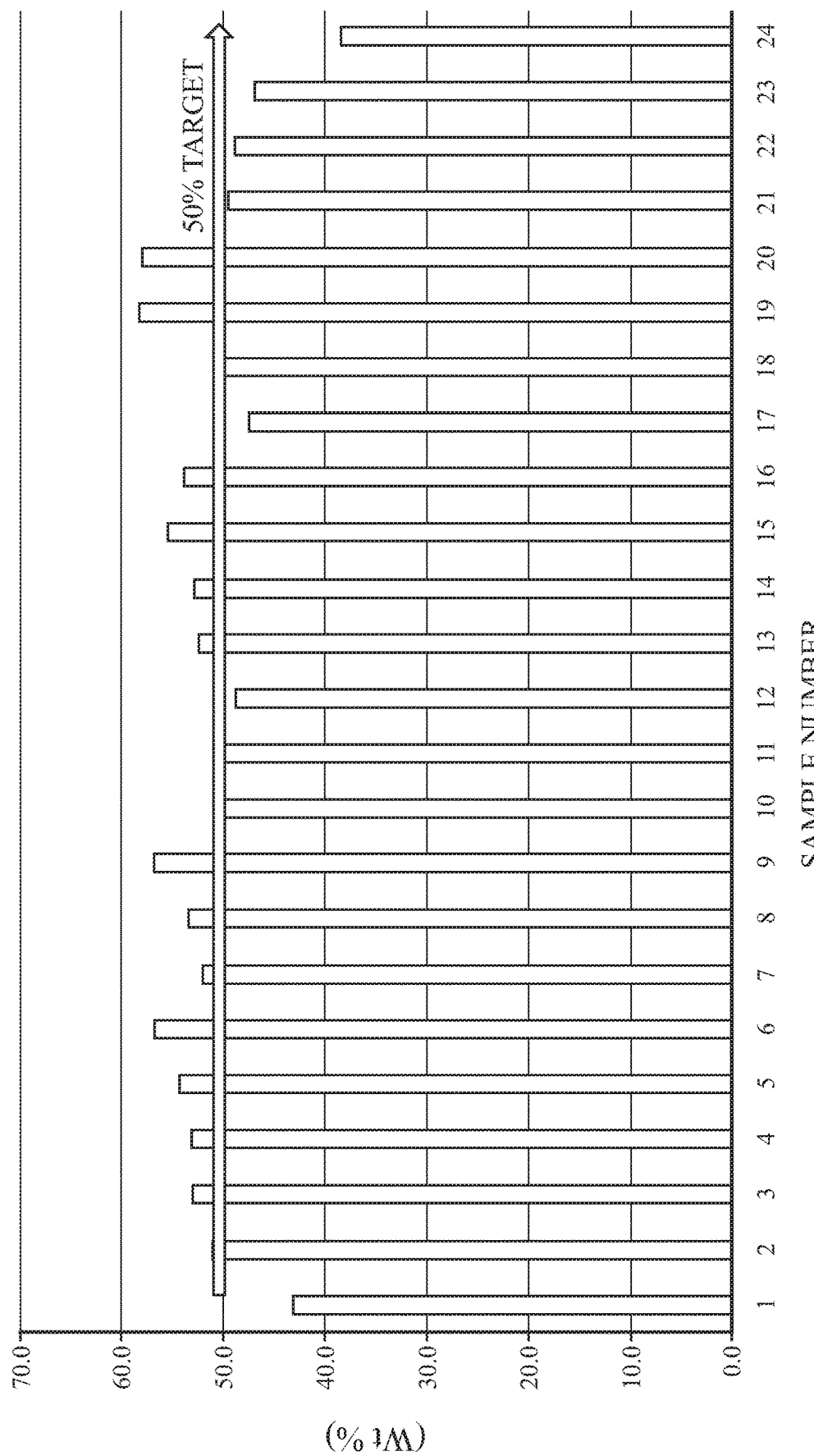

Trials conducted without dividers and with dividers showed that the carbon fiber distribution was more uniform and closer to the predetermined target, e.g. 50%, with the introduction of dividers (see FIGS. 10-11 and 12).

The divider 32 and distance to the carrier film 14 has predetermined dimensions and contours suitable and adaptable to the particular application. As best shown in FIG. 4, in an embodiment of the present invention, the distance between each divider 32 and carrier film 14 ('D') is generally 20 to 30 inches, typically, 21-25 inches, preferably 22-24 inches, most preferably 23 inches. The width ('W') of the thickest portion of the divider 32 is generally 3.5 to 6.5 inches, typically, 4 to 6 inches, preferably 5 to 5.75 inches, most preferably about 5.5 inches. The length ('L') of the divider 32 is generally 15 to 23 inches, typically, 16 to 20 inches, preferably 17-19 inches, most preferably about 18 inches. Preferably, the top portion 47 of the divider adjacent the cutter 26 is contoured and has a width ('W and/or W") smaller than the lower portion of the divider 32 e.g., to a width of 2 to 3 inches, preferably 2 to 2.50 inches. The divider 32 is generally not more than 0.25 inches thick, typically about 0.2 inches thick, preferably less than 0.15 inches thick, most preferably not more than 0.13 inches thick. The gap, indicated generally at 'G', between the bottom of the cutter is generally not more than 2 inches, typically, not more than 1.5 inches, preferably, not more than 1 inch, most preferably 0.45 to 0.75 inches. Preferably, the width of the chambers 39 or distance between adjacent dividers 32 is generally not more than 5 inches, typically not more than 4 inches, preferably not more than 3 inches, most preferably, 3 inches. Other dimensions are contemplated depending on the application without departure from the scope of the present invention.

In accordance with the present invention the process of the present invention provides improved techniques to manufacture carbon SMC materials including: Quasi isotropic properties, being the ability to use single layer and achieve quasi isotropic properties; it provides a uniform carbon distribution; Parts molded with this SMC compound had a lower coefficient of standard deviation in the properties; a consistent quality of Carbon SMC is produced with substantially no dry fibers or resin rich areas; and, the final SMC has superior mechanical properties.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A process for producing a carbon sheet molding composition comprising the steps of:
   a. providing a sheet molding compound (SMC) manufacturing line including at least one conveyor line for uniform spreading SMC resins on a carrier film with uniform tensioning, devoid of wrinkles, achieved using an articulating elastomeric roll located at a lead of doctor boxes and at least one pair of side nip rolls located at an exit of the doctor boxes;
   b. providing a liquid resin consistently spread on the carrier film without defects caused by wrinkles in the carrier film;
   c. providing a chopper system comprising a cutter for chopping raw carbon fiber strands into predetermined sizes suitable for adding to the liquid resin; and
   d. chopping the carbon fiber strands to provide chopped carbon fiber; and
   e. distributing said chopped carbon fiber to said liquid resin, which said chopped carbon fiber is evenly distributed and randomized using dehumidified air, wherein a dehumidifier is integrated at an entry side of a creel box and dehumidified air from the dehumidifier is passed through the creel box through a plenum to an inlet of said chopper system.

2. The process of claim 1, wherein the sizes are in a range of from about 13 mm to up to 75 mm long.

3. The process of claim 1, wherein a carbon fiber length is about 25 mm.

4. The process of claim 1, wherein the cutter includes individual chopper chambers having dividing walls between the chopper chambers for assistance with distribution of the chopped carbon fibers.

5. The process of claim 4, wherein each dividing wall is about 21 to 25 inches from the carrier film to allow some overlapping of distributed chopped carbon fiber.

6. The process of claim 4, wherein a gap between a bottom of the cutter and one of the dividing walls is in a range of about 0.45 to 0.75 inch.

7. The process of claim 4, further comprising a transvector apparatus having a series of controllable air outlets to a plurality of transvectors for adjusting a flow of chopped carbon fiber evenly between said dividing walls and onto the liquid resin containing carrier film moving along the conveyor.

8. The process of claim 7, wherein the dehumidified air is also supplied to the plurality of transvectors respectively to provide a reduced level of humidity in forced air used to debundle the chopped carbon fiber.

9. The process of claim 7, further comprising controlling air movement within the chopper system by adjusting an air flow to the plurality of transvectors and controlling at least two exhausts operably coupled to an air vacuum system for balancing air pressure inside the chopper and minimizing over exhausting.

10. The process of claim 7, wherein an air flow is about 4.5 to 6.2 cubic feet per minute.

11. The process of claim 1, further comprising a mechanism for depositing a second resin coated carrier film free of wrinkles, after the chopped carbon fiber is deposited onto the liquid resin coated carrier film moving along the conveyor.

12. The process of claim 1, wherein the process provides uniform debundling of high yield chopped carbon yarns with equal to or greater than 12,000 filaments per yarn.

13. The process of claim 1, wherein the process provides uniform opening of high yield chopped carbon yarns with equal to or greater than 50,000 filaments per yarn.

14. The process of claim 1, wherein each of said at least one pair of side nip rolls comprises a first roll and a second roll positioned at about 45 degrees to a line direction of the carrier film, wherein the first roll and second roll are on opposite edges of the carrier film which helps in spreading the film and removes wrinkles.

15. A process adapted for producing carbon sheet molding compositions comprising the steps of:
   a. providing a sheet molding compound (SMC) manufacturing line including at least one conveyor line for uniform spreading SMC resins on at least one carrier film with uniform tensioning, devoid of wrinkles, achieved using an articulating elastomeric roll located at a lead of at least one resin doctor box and a plurality of side nip rolls with at least one of each nip roll on each side of the carrier film at an angle to side edges of the carrier film, said plurality of side nip rolls located at an exit of said at least one resin doctor box;

b. providing at least one chopper system with a plurality of dividers defining a plurality of chambers to assist with distribution of chopped carbon fibers;

c. providing a first exhaust before a chopper of the at least one chopper system and a second exhaust after the chopper, wherein exhaust openings neutralize air pressure within the chopper system to prevent chopped carbon fiber from being pulled in one particular direction or side of the chambers;

d. providing a liquid resin film, consistently spread on the carrier film without defects caused by wrinkles in the carrier film; and, e. providing a chopped carbon fiber which is evenly distributed and randomized onto the resin carrier film using dehumidified and amplified air flow supplied to a transvector apparatus adjacent the plurality of chambers.

16. The process of claim 15, wherein said transvector apparatus has a series of controllable air outlets coupled to a plurality of transvectors for adjusting the flow of high velocity air to each of the plurality of chambers.

17. The process of claim 15, further comprising a mechanism for depositing a second resin coated carrier film free of wrinkles, after the chopped carbon fiber is deposited on to the resin coated carrier moving along the conveyor.

18. A process for producing a carbon sheet molding composition comprising the steps of:

providing continuous carbon fiber strands;
providing at least one resin material;
providing at least one carrier film;
providing at least one sheet molding compound (SMC) manufacturing line including at least one conveying system for moving the at least one carrier film along the SMC line;

providing at least one articulating spreader roll with angled ends located adjacent a doctor box for delivering the resin material;

providing at least one pair of side nip rolls with a nip roll on each side of the carrier film at an angle relative to side edges of the carrier film, said at least one pair of side nip rolls located adjacent the doctor box, said at least one articulating spreader roll and the at least one pair of side nip rolls keeping the carrier film under tension and preventing or removing any wrinkles in the carrier film;

providing a chopper system for chopping the continuous carbon fiber strands, said chopper system including a plurality of chambers each with a cutter for chopping the strands and dividers extending to an exit side of the chopper;

providing a plurality of transvectors with air flow control and operable to receive compressed air and dehumidified air, said plurality of transvectors adjacent to the plurality of chambers to deliver air of predetermined velocity to each of the plurality of chambers for debundling chopped carbon fiber;

providing an exhaust system operable to balance air pressure from the plurality of transvectors and exhaust excess air from the plurality of chambers to prevent the chopped carbon fiber from crossing from one chamber to a next of the plurality of chambers;

depositing the at least one resin material onto the at least one carrier film as the conveyor moves the carrier film under tension along the conveyor;

delivering dehumidified air and the compressed air to the plurality of transvectors and uniformly distributing debundled chopped carbon fibers onto the resin on the carrier film, wherein the dividers in combination with the plurality of transvectors provide the uniform distribution of debundled chopped carbon fibers onto the resin on the carrier film.

* * * * *